(12) United States Patent
Igeta et al.

(10) Patent No.: US 8,466,865 B2
(45) Date of Patent: Jun. 18, 2013

(54) LIQUID CRYSTAL DISPLAY DEVICE

(75) Inventors: Koichi Igeta, Mobara (JP); Toshiki Asakura, Togane (JP)

(73) Assignees: Hitachi Displays, Ltd, Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 270 days.

(21) Appl. No.: 12/923,566

(22) Filed: Sep. 28, 2010

(65) Prior Publication Data

US 2011/0018791 A1    Jan. 27, 2011

Related U.S. Application Data

(62) Division of application No. 11/131,225, filed on May 18, 2005, now Pat. No. 7,825,884.

(30) Foreign Application Priority Data

May 31, 2004    (JP) ................................ 2004-160490

(51) Int. Cl.
    *G09G 3/36*      (2006.01)
(52) U.S. Cl.
    USPC ................................. 345/88; 345/87; 345/89

(58) Field of Classification Search
    USPC ............... 345/87–100, 83; 349/106, 109, 114
    See application file for complete search history.

(56) References Cited

U.S. PATENT DOCUMENTS

| | | | | |
|---|---|---|---|---|
| 6,124,909 A | * | 9/2000 | Miyashita et al. | 349/109 |
| 6,215,538 B1 | * | 4/2001 | Narutaki et al. | 349/106 |
| 6,897,922 B2 | | 5/2005 | Ikeno et al. | |
| 2001/0004276 A1 | * | 6/2001 | Urabe et al. | 349/106 |
| 2003/0095228 A1 | | 5/2003 | Hiji et al. | |
| 2003/0222840 A1 | | 12/2003 | Koga et al. | |
| 2004/0218123 A1 | | 11/2004 | Park et al. | |

FOREIGN PATENT DOCUMENTS

| | | |
|---|---|---|
| JP | 2003-140174 | 5/2003 |
| JP | 2003-308048 | 10/2003 |
| JP | 2004-45702 | 2/2004 |

* cited by examiner

*Primary Examiner* — Kimnhung Nguyen
(74) *Attorney, Agent, or Firm* — Stites & Harbison PLLC; Juan Carlos A. Marquez, Esq.; Nicholas B. Trenkle, Esq.

(57) ABSTRACT

The present invention provides a liquid crystal display device which includes a first pixel and a second pixel which are arranged close to each other and are allocated to the same color, and color filters which differ in color tone and are formed on the first pixel and the second pixel, wherein a voltage for driving liquid crystal of the first pixel and a voltage for driving liquid crystal of the second pixel are controlled independently from each other.

5 Claims, 13 Drawing Sheets

High Gray Scale ⟶ Low Gray Scale

LIQUID CRYSTAL DISPLAY DEVICE

CROSS REFERENCE TO RELATED APPLICATIONS

This application is a Divisional Application of U.S. application Ser. No. 11/131,225 filed on May 18, 2005 now U.S. Pat. No. 7,825,884. Priority is claimed based on U.S. application Ser. No. 11/131,225 filed on May 18, 2005, which claims the priority to Japanese Patent Application No. 2004-160490 filed May 31, 2004, all of which is incorporated by reference.

BACKGROUND OF THE INVENTION

1. Field of the Invention

The present invention relates to a liquid crystal display device.

2. Description of the Related Art

The liquid crystal display device is configured such that respective substrates which are arranged to face each other with liquid crystal therebetween form an envelope and a large number of pixels are provided in the spreading direction of the liquid crystal.

Each pixel includes a pair of electrodes, wherein in response to an intensity of an electric field generated by a voltage (a gray scale) applied to these electrodes, the liquid crystal in the inside of the pixel is activated, and a quantity of light which passes through the activated liquid crystal is visualized through a polarizer and the like.

The light which passes through the liquid crystal (the visible light: a wavelength thereof being within a range of approximately 380 nm to 780 nm) has a transmissivity thereof changed for every wavelength depending on a gray scale. This phenomenon is considered to be brought about by a fact that an optical axis direction of the liquid crystal is changed in response to the gray scale and hence, a polarized state of the light is changed.

Further, in a liquid crystal display device for color display, red, green and blue color filters are provided to three neighboring respective pixels and the above-mentioned light transmission quantity based on the gray scale is obtained in the pixels which are allocated to respective colors and a desired color is obtained by mixing these colors.

Further, a technique which enriches the expression of the gray scales based on such a constitution is disclosed in Japanese Patent Laid-Open 2003-308048 (corresponding to United States Patent Laid-Open US2003222840A1). Further, a technique to enhance the color reproducibility based on such a constitution is disclosed in Japanese Patent Laid-Open 2004-45702. However, these techniques are provided for mounting pixels which differ in size in the inside of one pixel or to correct data and hence, these techniques differ from the present invention described hereinafter with respect to the constitution as well as advantageous effects.

SUMMARY OF THE INVENTION

Here, there has been known a chromaticity diagram which is referred to as a so-called CIE chromaticity coordinates and expresses colors in plane based on color hue and the degree of saturation which are directly relevant to colors among three elements of colors. This chromaticity diagram is popularly used to obtain the reproducibility of the color even in the liquid crystal display device, not to mention a color television receiver set.

However, in the liquid crystal display device having the above-mentioned constitution, it has been confirmed that when the transmissivities of the lights at the respective wavelengths are changed depending on the gray scales, the color which is to be displayed on the same chromaticity coordinates in the above-mentioned CIE chromaticity coordinates originally is displaced depending on the gray scale, that is, the luminance.

That is, this implies that the color is changed and it has been confirmed that the liquid crystal display device fails to sufficiently exhibit a fundamental function of the display that the color is to be faithfully displayed in response to an input signal.

The present invention has been made under such circumstances and it is an advantage of the present invention to provide a liquid crystal display device which can obviate the change of a desired color due to a gray scale.

To briefly explain the summary of typical inventions among the inventions disclosed in the present invention, they are as follows.

(1)

A liquid crystal display device according to the present invention, for example, includes a first pixel and a second pixel which are arranged close to each other and are allocated to the same color, color filters which differ in color tone are formed on the first pixel and the second pixel, and a voltage for driving liquid crystal of the first pixel and a voltage for driving liquid crystal of the second pixel are controlled independently from each other.

(2)

A liquid crystal display device according to the present invention, for example, includes a pixel which is allocated to one color, and color filters which differ in color tone are formed on a first divided region and a second divided region of the pixel, and a layer thickness of liquid crystal in the first divided region is set larger than a layer thickness of liquid crystal in the second divided region.

(3)

A liquid crystal display device according to the present invention, for example, includes a pixel electrode and a counter electrode which are formed in the inside of a pixel formed on one substrate out of respective substrates which are arranged with liquid crystal therebetween, and at least one of these electrodes is constituted of a group consisting of a plurality of electrodes which are arranged in parallel, and color filters which are allocated to the same color and differ in color tone are formed in a first divided region and a second divided region of the pixel, and a distance between the neighboring electrodes differs between the first divided region and the second divided region.

(4)

A liquid crystal display device according to the present invention, for example, includes a pixel electrode and a counter electrode which are formed in the inside of a pixel formed on one substrate out of respective substrates which are arranged with liquid crystal therebetween, and at least one of these electrodes is constituted of a group consisting of a plurality of electrodes which are arranged in parallel, and color filters which are allocated to the same color and differ in color tone are formed in a first divided region and a second divided region of the pixel, and an angle in which the respective electrodes of the group of electrodes are inclined with respect to an imaginary line differs between the first divided region and the second divided region.

(5)

The liquid crystal display device according to the present invention is, for example, on the premise of the constitution (1), characterized in that the respective color filters which differ in color tone differ in coordinates on CIE chromaticity coordinates.

(6)

The liquid crystal display device according to the present invention is, for example, on the premise of the constitution (1), characterized in that the second pixel is configured as a pixel which compensates the coordinates displacement in the CIE chromaticity coordinates of display information from the first pixel.

(7)

The liquid crystal display device according to the present invention is, for example, on the premise of any one of the constitutions (2) to (4), characterized in that the second divided region is configured as a pixel which compensates the coordinates displacement in CIE chromaticity coordinates of display information from the first divided region.

(8)

The liquid crystal display device according to the present invention is, for example, on the premise of the constitution (1), characterized in that the liquid crystal display device is driven in a state that the luminance of the first pixel is set larger than the luminance of the second pixel.

(9)

The liquid crystal display device according to the present invention is, for example, on the premise of any one of the constitutions (2) to (4), characterized in that the liquid crystal display device is driven in a state that the luminance of the first divided region is set larger than the luminance of the second divided region.

(10)

The liquid crystal display device according to the present invention is, for example, on the premise of the constitution (1), characterized in that the first color filter which is formed in the first pixel and the second color filter which is formed in the second pixel are formed in a state that when the chromaticity coordinates of color which are observed through a color filter of the same color are changed along with a change from a high gray scale to a low gray scale, the color filter which is specified by the coordinates at a starting-point side of the change movement is formed as the first color filter and the color filter which is specified by the coordinates at a terminal-point side of the change movement is formed as the second color filter.

(11)

The liquid crystal display device according to the present invention is, for example, on the premise of any one of the constitutions (2) to (4), characterized in that the first color filter formed in the first divided region and the second color filter formed in the second divided region are formed such that when the chromaticity coordinates of color which are observed through a color filter of the same color are changed corresponding to the change from a high gray scale to a low gray scale, a color filter which is specified with coordinates at a starting-point side of the change movement is formed as the first color filter and a color filter which is specified with the coordinates at a terminal-point side of the change movement is formed as the second color filter.

(12)

The liquid crystal display device according to the present invention is, for example, on the premise of either one of constitutions (3), (4), characterized in that out of the pixel electrode and the counter electrode, another electrode is formed on the substantially whole region of the pixel in a state that one electrode is overlapped to another electrode byway of an insulation film.

(13)

The liquid crystal display device according to the present invention is, for example, on the premise of either one of constitutions (3), (4), characterized in that out of the pixel electrode and the counter electrode, another electrode is constituted of a group consisting of a plurality of electrodes, and the respective electrodes are alternately arranged with respective electrodes of one electrode.

(14)

The liquid crystal display device according to the present invention is, for example, on the premise of the constitution (1), characterized in that the respective pixels which constitute a unit pixel for color display and are allocated to respective colors consisting of red, green and blue are formed in parallel, wherein the respective pixels respectively constitute the first pixels and are allocated to the corresponding colors, and the second pixels which have the same colors as these colors and are arranged close to the first pixels are provided.

(15)

The liquid crystal display device according to the present invention is, for example, on the premise of any one of the constitutions (2) to (4), characterized in that the respective pixels which constitute a unit pixel for color display and are allocated to respective colors consisting of red, green and blue are formed in a state that the respective pixels are arranged close to each other, and the first divided region and the second divided region are provided to each pixel.

Here, the present invention is not limited to the above-mentioned constitutions and various modifications can be made without departing from the technical concept of the present invention.

BRIEF DESCRIPTION OF THE DRAWING

FIG. 14A to FIG. 14C are plan views showing another embodiment of the constitution of pixels of a liquid crystal display device according to the present invention, wherein FIG. 14A shows electrodes, FIG. 14B shows a color filter, and FIG. 14C shows the relationship of a layer thickness of the liquid crystal;

FIG. 16A to FIG. 16C are plan views showing another embodiment of the constitution of pixels of a liquid crystal display device according to the present invention, wherein FIG. 16A shows electrodes, FIG. 16B shows a color filter, and FIG. 16C shows the relationship of a layer thickness of the liquid crystal;

FIG. 18A to FIG. 18C are plan views showing another embodiment of the constitution of pixels of a liquid crystal display device according to the present invention, wherein FIG. 18A shows electrodes, FIG. 18B shows a color filter, and FIG. 18C shows the relationship of a layer thickness of the liquid crystal;

FIG. 19A to FIG. 19C are plan views showing another embodiment of the constitution of pixels of a liquid crystal display device according to the present invention, wherein FIG. 19A shows electrodes, FIG. 19B shows a color filter, and FIG. 19C shows the relationship of a layer thickness of the liquid crystal;

FIG. 21A to FIG. 21C are plan views showing another embodiment of the constitution of pixels of a liquid crystal display device according to the present invention, wherein FIG. 21A shows electrodes, FIG. 21B shows a color filter, and FIG. 21C shows the relationship of a layer thickness of the liquid crystal;

FIG. 23A to FIG. 23C are plan views showing another embodiment of the constitution of pixels of a liquid crystal display device according to the present invention, wherein FIG. 23A shows electrodes, FIG. 23B shows a color filter, and FIG. 23C shows the relationship of a layer thickness of the liquid crystal;

FIG. 24A to FIG. 24C are plan views showing another embodiment of the constitution of pixels of a liquid crystal display device according to the present invention, wherein FIG. 24A shows electrodes, FIG. 24B shows a color filter, and FIG. 24C shows the relationship of a layer thickness of the liquid crystal;

FIG. 25A to FIG. 25C are plan views showing another embodiment of the constitution of pixels of a liquid crystal display device according to the present invention, wherein FIG. 25A shows electrodes, FIG. 25B shows a color filter, and FIG. 25C shows the relationship of a layer thickness of the liquid crystal.

DETAILED DESCRIPTION

Hereinafter, embodiments of a liquid crystal display device of the present invention are explained in conjunction with attached drawings.

Embodiment 1

Figure 1A:
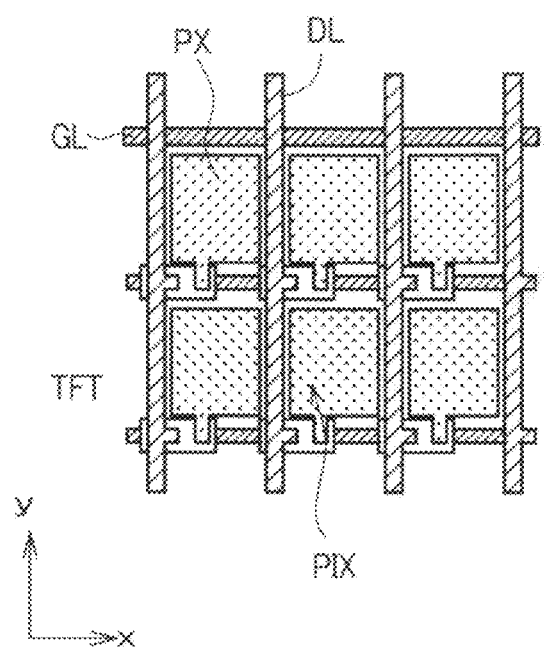
FIG. 1A and FIG. 1B are plan views showing one embodiment of the constitution of pixels of a liquid crystal display device according to the present invention and show one unit pixel for color display.
Figure 1B:
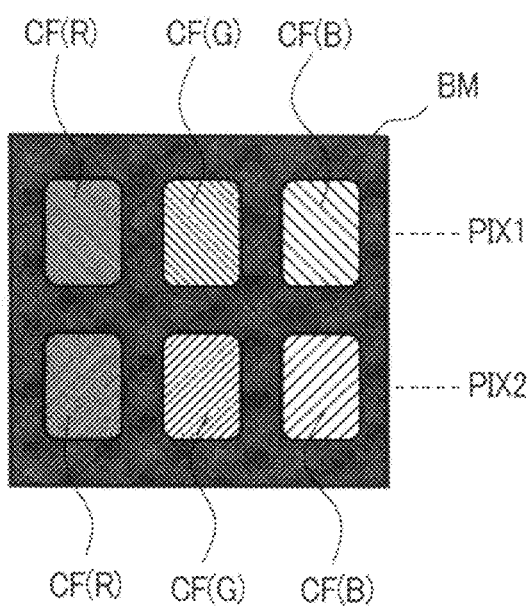

FIG. 1A and FIG. 1B are plan views showing one embodiment of the constitution of the pixels of a liquid crystal display device (TN type or VA type) according to the present invention. FIG. 1A shows the pixels which are formed on a liquid-crystal-side surface of one substrate out of substrates which are arranged to face each other with liquid crystal therebetween and FIG. 1B shows a black matrix and color filters which are formed on a liquid-crystal-side surface of another substrate. Here, both of FIG. 1A and FIG. 1B are plan views as viewed from a viewer's side.

The respective pixels PIX are arranged in a matrix array. In FIG. 1, six respective pixels in total are arranged in a 2×3 arrangement, wherein these six respective pixels PIX constitute one unit pixel for color display. Although the unit pixel for color display is usually constituted of three pixels which are respectively allocated to red, green and blue, in this embodiment, the unit pixel for color display is constituted of the number of pixels which is twice as large as the usual unit pixel for color display.

On a liquid-crystal-side surface of the transparent substrate SUB1 which constitutes one substrate, as shown in FIG. 1A, gate signal lines GL which extend in the x direction and are arranged in parallel in the y direction and drain signal lines DL which extend in the y direction and are arranged in parallel in the x direction are formed, and regions which are surrounded by these signal lines constitute regions where the pixels are formed.

The region of each pixel PIX includes a thin film transistor TFT which is turned on in response to a signal (a scanning signal) from one gate signal line GL (lower side in the drawing) out of the respective gate signal lines GL which sandwich the region, and a pixel electrode PX to which a signal (a video signal) is supplied from one drain signal line DL (left side in the drawing) out of the respective drain signal lines DL which sandwich the regions by way of the thin film transistor TFT.

The pixel electrode PX is constituted of a light transmitting conductive layer made of ITO (indium tin oxide) or the like, for example, and is formed over the whole region of a center portion of the pixel region except for a small periphery. Further, the pixel electrode PX is configured to generate an electric field between the pixel electrode PX and a counter electrode (not shown in the drawing) which is formed in common in each pixel region on a liquid-crystal-side surface of the transparent substrate SUB2 which constitutes another substrate and is also formed of a light transmitting conductive layer. A voltage which becomes the reference with respect to the video signal is supplied to the counter electrode.

In the respective pixels having such a constitution, a group of pixels which are constituted of a plurality of pixels arranged in parallel in the x direction in the drawing are selected by supplying signals to the gate signal lines GL, the video signal is supplied from the respective drain signal lines DL in conformity with the selection timing, and the liquid crystals of the pixels are driven in response to a voltage of the video signal. That is, these respective pixels can be driven independently from each other.

On the liquid-crystal-side surface of another transparent substrate SUB2, a black matrix BM which defines pixel regions corresponding to the pixel region on the transparent substrate SUB1 side is formed, and color filters CF are formed in regions of respective pixels corresponding to openings formed in the black matrix BM.

Here, in six respective pixels which adopt the 2×3 arrangement shown in the drawing, the color filters CF which exhibit red (R), green (G) and blue (B) are formed from the left side, for example, with respect to three respective pixels on an upper stage, while the color filters CF which exhibit red (R), green (G) and blue (B) are formed from the left side, for example, with respect to three respective pixels on an lower stage. Accordingly, in the unit pixel for color display, two pixels are allocated to each color.

Here, for facilitating the understanding the explanation made hereinafter, three respective pixels in the upper stage are respectively referred to as first pixels PIX1 while three respective pixels in the lower stage are respectively referred to as second pixels PIX2. In such a case, although described in detail later, the color tones of the color filters CF (R) in the respective pixels PIX1, PIX2 which are allocated to red (R) slightly differ from each other. That is, the coordinates of these color filters CF (R) on the CIE chromaticity coordinates are displaced from each other. The same goes for the color filters CF (G) in the respective pixels PIX1, PIX2 which are allocated to green (G) as well as the color filters CF (B) in the respective pixels PIX1, PIX2 which are allocated to blue (B).

Further, signals (video signals) which are supplied to the respective pixels PIX1, PIX2 which are allocated to red (R) also have a slight voltage difference. That is, with respect to a voltage corresponding to a desired gray scale, the voltage differs on the pixel PIX2 side, for example, or the voltages differ on both of the respective pixel PIX1, PIX2 sides.

Such a constitution is provided for allowing the display which is formed of the color mixture of the light which is obtained after the light passes through the liquid crystal in one pixel PIX1 (activated by the signal supplied to the pixel PIX1) and the color filter CF (R) formed on the pixel PIX1, and the light which is obtained after the light passes through the liquid crystal in another pixel PIX2 (activated by the signal supplied to the pixel PIX2) and the color filter CF (R) formed on the pixel PIX2, to exhibit the desired color tone without being influenced by the gray scales.

This can be also understood that although the pixel PIX1 which exhibits each color changes the color tone thereof depending on the gray scale, this change of color tone can be corrected by the pixel PIX2 whereby, it is possible to make the color tone uniform.

Figure 2:
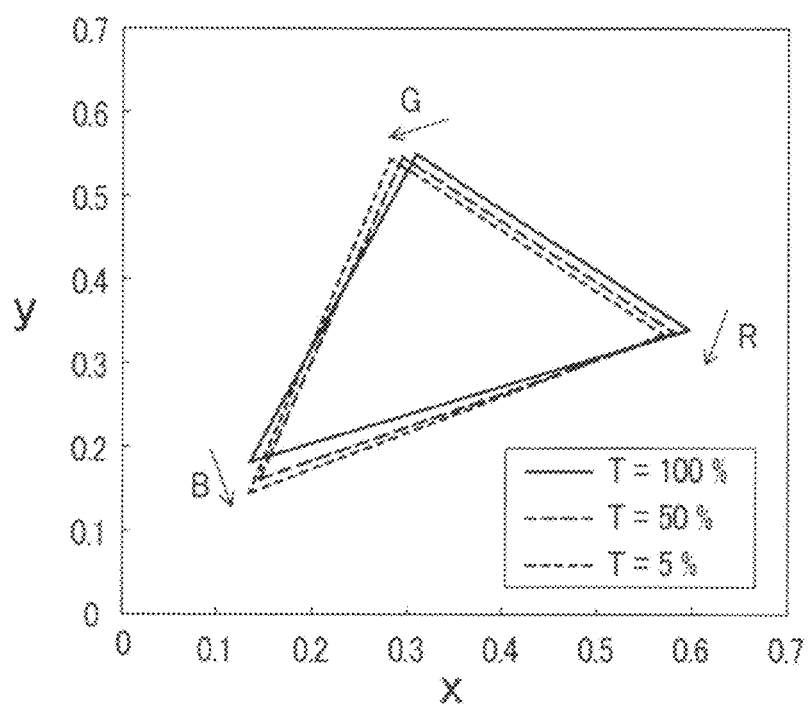
FIG. 2 is a CIE chromaticity coordinates diagram showing an example of the displacement of color tone attributed to gray scales when the present invention is not applied.

FIG. 2 shows a case in which the color display is performed without forming such a correction pixel (PIX2) and is a view which shows the gray scale dependency in the CIE chromaticity coordinates when the display is performed in a normally white mode.

In the drawing, each characteristic diagram which is formed of a triangular shape indicates the relative transmissivity (the relative luminance), wherein a solid line indicates a case of the transmissivity (T=100%) when the transmissivity is 100% of the maximum transmissivity, a bold dotted line indicates a case of transmissivity (T=50%) when the transmissivity is 50% of the maximum transmissivity, and a fine dotted line indicates a case of transmissivity (T=5%) when the transmissivity is 5% of the maximum transmissivity. Here, in each characteristic diagram, with respect to respective apical angle portions in the drawing, a point R indicates red (R), a point G indicates green (G) and a point B indicates blue (B) respectively.

In the drawing, arrows indicate the moving directions of the above-mentioned characteristic diagram when the gray scale is changed from the high gray scale (with the high relative transmissivity) to the low gray scale (with the low relative transmissivity).

As can be clearly understood from the change of the characteristic diagram in the above-mentioned arrow directions, the chromaticity coordinates of R are moved in the respective -x, -y directions, the chromaticity coordinates of G are moved in the respective -x, -y directions, and the chromaticity coordinates of B are moved in the -y direction.

That is, with respect to all respective colors of R, G, B, the chromaticity coordinates are shifted due to the change of the gray scales. This implies that the signal (the video signals: signals which include the gray scales) which are inputted to the unit pixel for color display cannot be accurately outputted for displaying and hence, the color having the chromaticity which is different from the color to be displayed originally is displayed.

Figure 3:
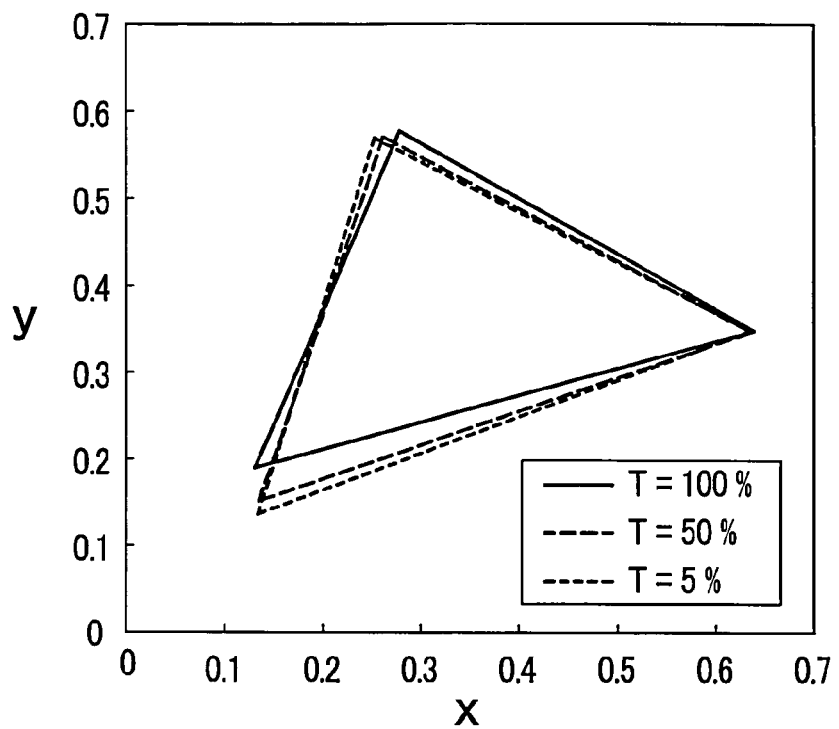
FIG. 3 is a CIE chromaticity coordinates diagram showing another example of the displacement of color tone attributed to gray scales when the present invention is not applied.
Figure 4:
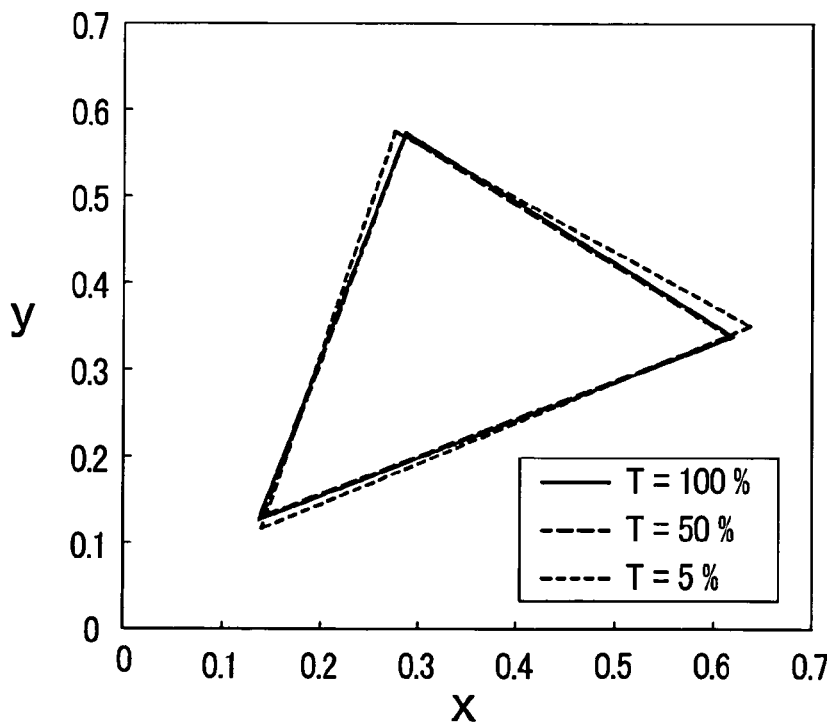
FIG. 4 is a CIE chromaticity coordinates diagram showing another example of the displacement of color tone attributed to gray scales when the present invention is not applied.

To explain the constitutions of the related art, FIG. 3 is a view which shows the gray scale dependency in the CIE chromaticity coordinates when a VA-type liquid crystal display device performs a display in a normally black mode, and FIG. 4 is a view which shows the gray scale dependency in the CIE chromaticity coordinates when an IPS-type liquid crystal display device performs a display in a normally black mode. It is confirmed that phenomena similar to the above-mentioned phenomenon appear with respect to these cases.

Figure 5:
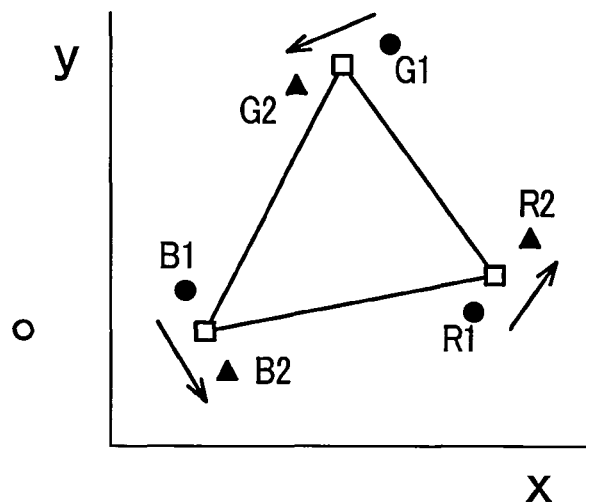
FIG. 5 is an explanatory view showing a reason that an advantageous effect of the present invention is obtained.

To the contrary, FIG. 5 shows an explanatory view which shows a technique for obviating the displacement attributed to the gray scales of the chromaticity coordinates thus allowing the liquid crystal display device to display the color to be displayed originally. FIG. 5 corresponds to the above-mentioned FIG. 3 and the like.

In FIG. 5, R1, G1, B1 are coordinates which indicate the characteristics of the color filter CF in the first pixel PIX1 and R2, G2, B2 are coordinates which indicate the characteristics of the color filter CF in the second pixel PIX2.

Figure 7:
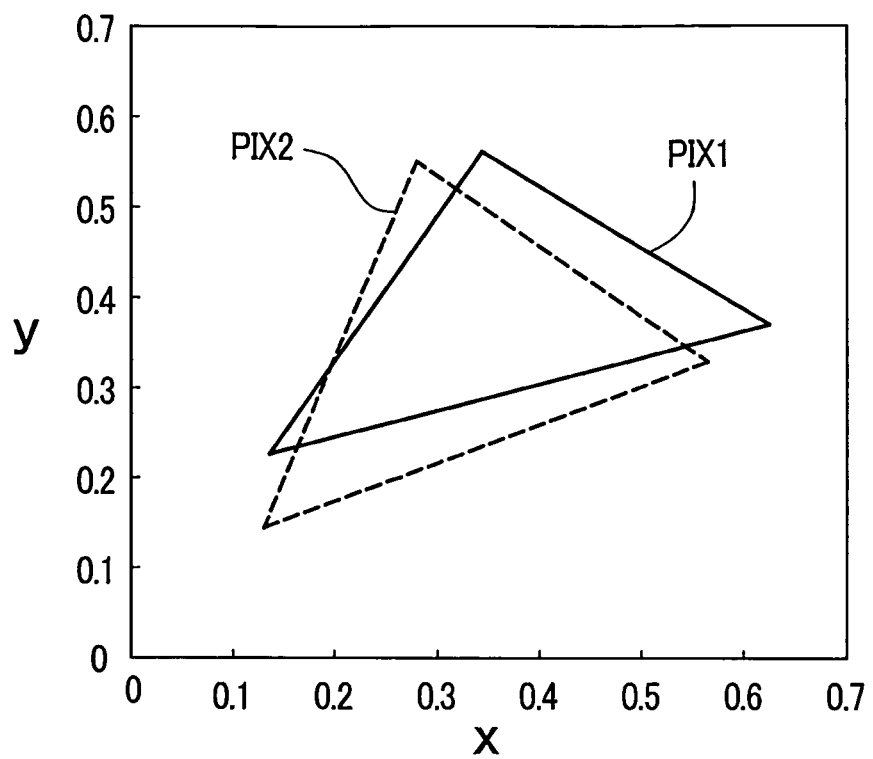
FIG. 7 is a graph which specifies one example of a color filter used in the first pixel and the second pixel which are allocated to the same color in the pixels of the liquid crystal display device according to the present invention using the CIE chromaticity.

This represents that, as shown in FIG. 7, the chromaticity characteristics of the color filter CF formed on the first pixel PIX1 side and the chromaticity characteristics of the color filter CF formed on the second pixel PIX2 side are formed to produce the displacement.

When the liquid crystal is driven by changing the gray scales of the voltages applied to the first pixels PIX1 and the second pixel PIX2 formed in this manner from the high gray scale to the low gray scale, the respective chromaticity coordinates are observed with naked eyes in a state that the chromaticity coordinates are moved and changed as indicated by an arrow shown in the drawing, for example.

Here, the consideration is made by extracting the first pixel PIX1 and the second pixel PIX2 provided with the color filter of red (R). The chromaticity coordinates of the color filter CF (R) on the first pixel PIX1 side is indicated by R1, while the chromaticity coordinates of the color filter CF (R) on the second pixel PIX2 side is indicated by R2. In this case, the luminance (brightness) in the first pixel PIX1 is always held larger than the luminance (brightness) in the second pixel PIX2.

Figure 6:
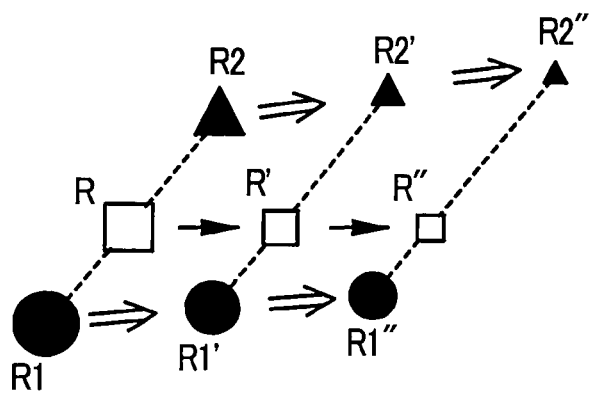
FIG. 6 is an explanatory view showing a reason that an advantageous effect of the present invention is obtained.

Then, when the liquid crystal is driven to move the gray scale from the so-called high gray scale to the so-called low gray scale with respect to the voltage, that is, the gray scale for driving the first pixel PIX1 and the second pixel PIX2, as shown in FIG. 6, the chromaticity coordinates which are recognized through the color filter CF (R) in the first pixel PIX1 are changed and are moved in the arrow direction in the drawing (R1 ⇒ R1' ⇒ R1"). In the same manner, the chromaticity coordinates which are recognized through the color filter CF (R) in the second pixel PIX2 are also changed and are moved in the arrow direction in the drawing (R2 ⇒ R2' ⇒ R2"). In FIG. 6, sizes of a black circle, a black triangle and a white square are schematically shown for explaining the luminance. Hereinafter, such a case is explained as an example.

In this case, in these steps, first of all, the chromaticity coordinates of the mixed color from the first pixel PIX1 and the second pixel PIX2 which are observed through the respective color filters CF (R) are positioned as R on a line segment which connects R1 and R2. Assuming the luminance (brightness) in the first pixel PIX1 equal to the luminance (brightness) of the second pixel PIX2 temporarily, R is positioned at a middle point between R1 and R2. In this case, along with the change of the display from the high gray scale to the low gray scale, the chromaticity coordinates of R is displaced. To the contrary, according to the present invention, by adjusting a ratio of luminance between the first pixel PIX1 and the second pixel PIX2 along with the change of the gray scales, it is possible to realize the reduction or the elimination of the change of chromaticity of R. In the example shown in FIG. 6, by changing the balance of luminance along with the lowering of the gray scale, the position of the above-mentioned R(R ⇒ R' ⇒ R") is pulled toward the large luminance side and hence, the R is observed as if the R is positioned on the same coordinates in appearance. That is, in spite of the fact that the gray scale is changed, there arises no change in color tone which is observed with naked eyes through the respective color filters.

Such a state can be realized with respect to G when the adjustment is performed at portions G1, G2 shown in the above-mentioned FIG. 5 or with respect to B when the adjustment is performed at portions B1, B2. Here, out of two pixels PIX1 and PIX2, the pixel whose luminance ratio is to be increased when the gray scale is changed may be determined by the direction which offsets the direction of the change of color tone which the display mode of the panel indicates.

Such a phenomenon, in the constitution shown in FIG. 1, arises between the first pixel PIX1 and the second PIX2 which include the color filters CF of the respective same colors consisting of red, green and blue (as described above, the color filters CF of the first pixel PIX1 and the second pixel PIX2 have coordinates thereof slightly displaced in the CIE chromaticity coordinates). Eventually, the color tones of these color filters are not changed in spite of the change of the gray scale and hence, it is also possible to obtain the color tone which is not changed even in the color mixture display obtained by one unit pixel of the color display.

Figure 8:
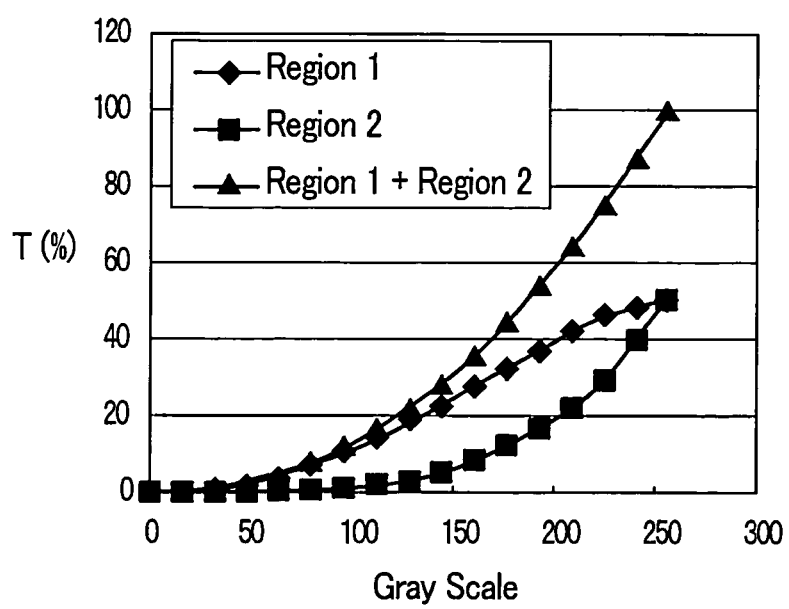
FIG. 8 is a graph showing the relationship between the relative luminance obtained by the first pixel and the second pixel allocated to the same color and the gray scale in the pixel of the liquid crystal display device according to the present invention.

FIG. 8 is a characteristic diagram which shows the relationship between the gray scales which are respectively applied to the first pixel PIX1 (indicated by a region 1 in the drawing) and the second pixel PIX2 (indicated by a region 2 in the drawing) in one pixel and the relative luminance (T) obtained by these gray scales, wherein one pixel is any one of pixels which have color filters of red (R), green (G) and blue (B).

Here, even when the same gray scale signal is applied from the video signal, the luminance obtained in the first pixel PIX1 (the region 1) and the luminance obtained in the second pixel PIX2 (the region 2) are made different from each other (this specific constitution being described later) so as to always establish the relationship (luminance obtained in the first pixel PIX1) (luminance obtained in the second pixel PIX2). As has been explained in conjunction with FIG. 6, this provision is made to hold the luminance (brightness) in the first pixel PIX1 always larger than the luminance (brightness) of the second pixel PIX2.

The respective luminance which are observed through the first pixel PIX1 and the second pixel PIX2 are recognized as a sum of the luminance from the first pixel PIX1 and the luminance from the second pixel PIX2.

Figure 9:
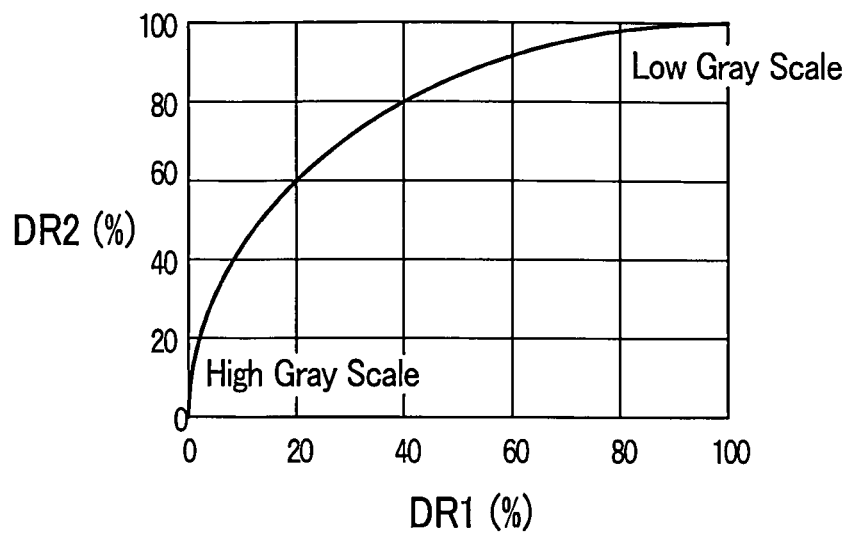
FIG. 9 is a graph showing an example of a driver output supplied to the first pixel and the second pixel allocated to the same color in the pixel of the liquid crystal display device according to the present invention.

FIG. 9 is a graph which shows the relationship between a driver output DR1 which supplies signals to the first pixel PIX1 (the region 1) and a driver output DR2 which supplies signals to the second pixel PIX2 (the region 2) as relative ratios. With respect to the gray scales which are expected to be obtained in the first pixel PIX1 and the second pixel PIX2 respectively, the driver output supplied to the first pixel PIX1 is set to a relatively large value while the driver output supplied to the second pixel PIX2 is set to a relatively small value.

Figure 10:
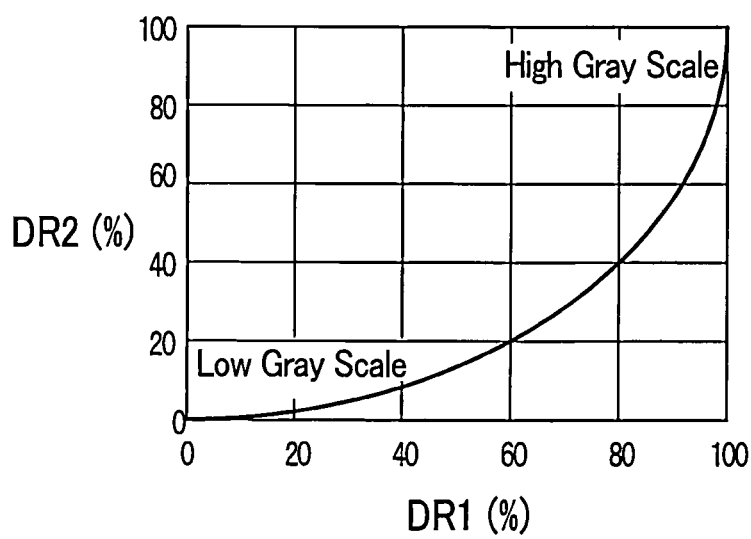
FIG. 10 is a graph showing another example of a driver output supplied to the first pixel and the second pixel allocated to the same color in the pixel of the liquid crystal display device according to the present invention.

Here, FIG. 9 is the graph which shows the relationship between the driver output which supplies the signals to the first pixel PIX1 and the driver output which supplies the signals to the second pixel PIX2 in the so-called normally white mode. However, in the case of the normally black mode, the above-mentioned relationship is reversed as shown in FIG. 10.

In the normally white mode (the TN method or the like), the display assumes the high gray scale when the relative output of the driver approaches 0% and assumes the low gray scale when the relative output of the driver approaches 100%, while in the normally black mode (the VA method, the IPS method or the like), the display assumes the low gray scale when the relative output of the driver approaches 0% and assumes the high gray scale when the relative output of the driver approaches 100%.

Figure 11:
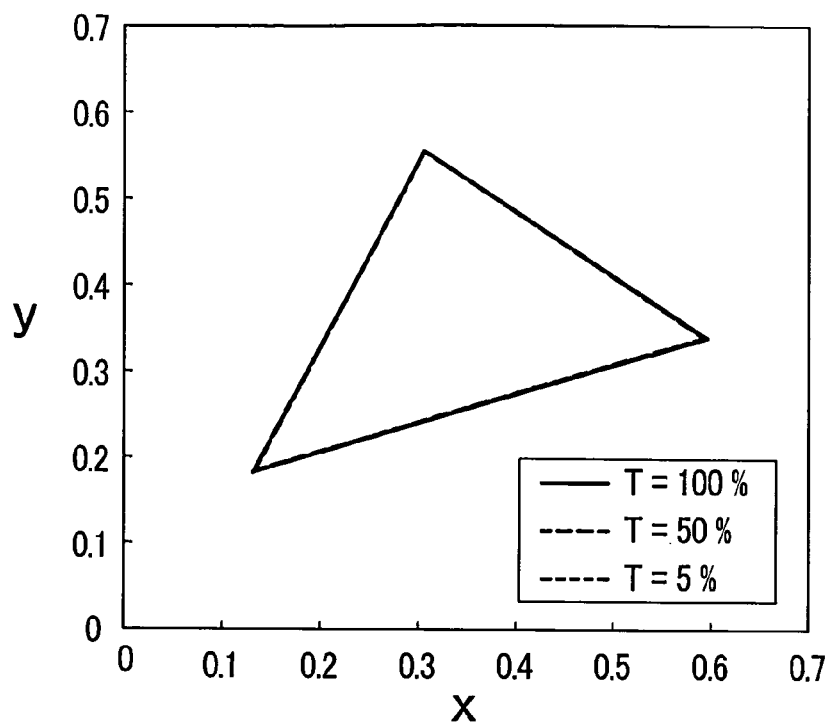
FIG. 11 is a graph showing an advantageous effect of the liquid crystal display device according to the present invention.

FIG. 11 is a graph which confirms the gray scale dependency of the chromaticity coordinates in the liquid crystal display device having the above-mentioned constitution. In FIG. 11, a solid line shows a case when the relative transmissivity is 100%, a bold dotted line indicates a case when the relative transmissivity is 50% and a fine dotted line indicates a case in which the relative transmissivity is 5%. These lines are illustrated in an overlapped manner to an extent that it is difficult to identify the respective lines.

Figure 12:
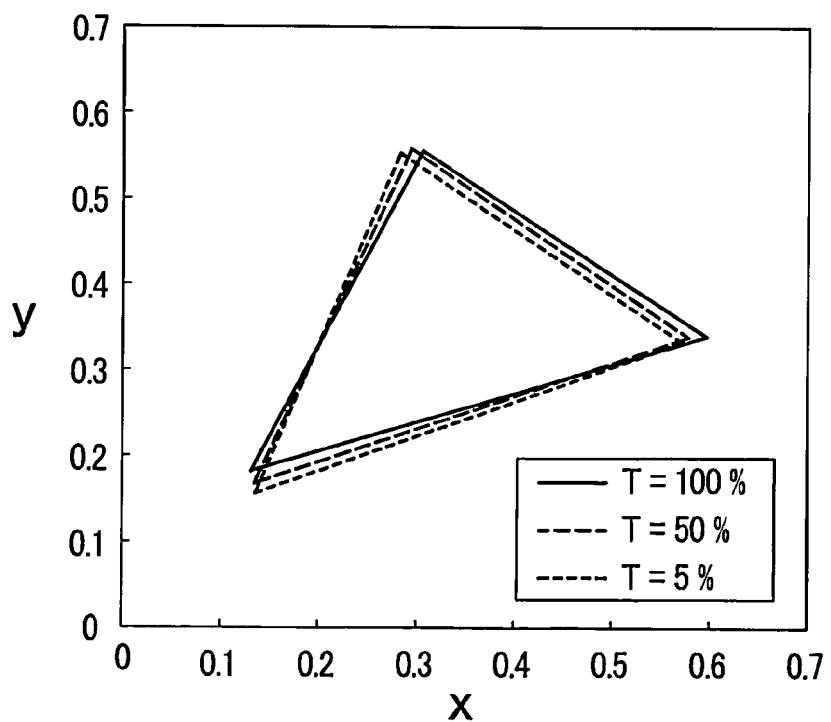
FIG. 12 is a graph similar to a graph shown in FIG. 11 when the present invention is not applied and is a comparison view with respect to FIG. 11.

To the contrary, FIG. 12 shows the gray scale dependency of the chromaticity coordinates in the conventional liquid crystal display device which does not adopt the above-mentioned constitution. Although this drawing is equal to the drawing which is quoted in the explanation for clarifying the advantageous effect obtained by the constitution of this embodiment, the drawing is again illustrated for a comparison purpose.

Embodiment 2.

Figure 13A:
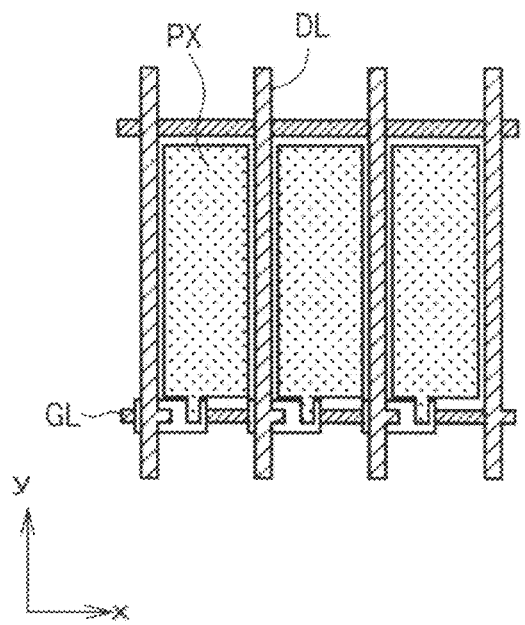
FIG. 13A and FIG. 13B are plan views showing another embodiment of the constitution of pixels of a liquid crystal display device according to the present invention and shows one unit pixel for color display.
Figure 13B:
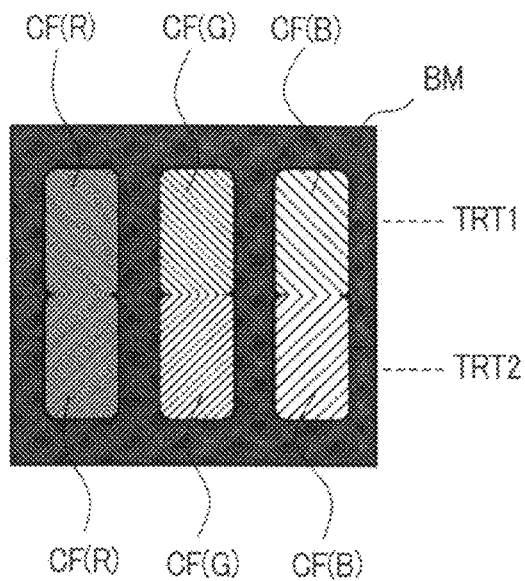

FIG. 13A and FIG. 13B are plan views showing one embodiment of the constitution of the pixel of the liquid crystal display device according to the present invention and corresponds to FIG. 1. In the same manner as FIG. 1, FIG. 13A shows pixels which are formed on a liquid-crystal-side surface of a transparent substrate SUB1 out of substrates which are arranged to face each other with liquid crystal therebetween, and FIG. 13B indicates a black matrix and color filters which are formed on a liquid-crystal-side surface of a transparent substrate SUB2.

In FIG. 13A, the constitution which makes this embodiment different from the constitution shown in FIG. 1A lies in that a unit pixel for color display is constituted of three pixels having the 1×3 arrangement and, at the same time, the size of each pixel is relatively largely configured in a state that the pixel is elongated in the y direction in the drawing, for example.

Further, the color filters CF formed in these respective pixels are formed of color filters which exhibit red (R), green (G), blue (B) from the left side in the drawing as shown in FIG. 13B. Here, each color filter CF is formed such that using an imaginary segment which extends in the x direction in the drawings at the center of each pixel as a boundary, the color tone of one side differs from the color tone of another side. That is, with respect to each pixel which is allocated to each color, in one region and another region which are divided from each other, the color filters CF which differ in color tone are formed. As described above, the difference in the color tone is expressed as the difference in coordinates in the CIE chromaticity coordinates.

Here, in each pixel, the upper-side region in the drawing with respect to the imaginary segment is referred to as a first region TRT1 and the lower-side region in the drawing with respect to the imaginary segment is referred to as a second region TRT2.

Figures 14A, 14B, 14C:
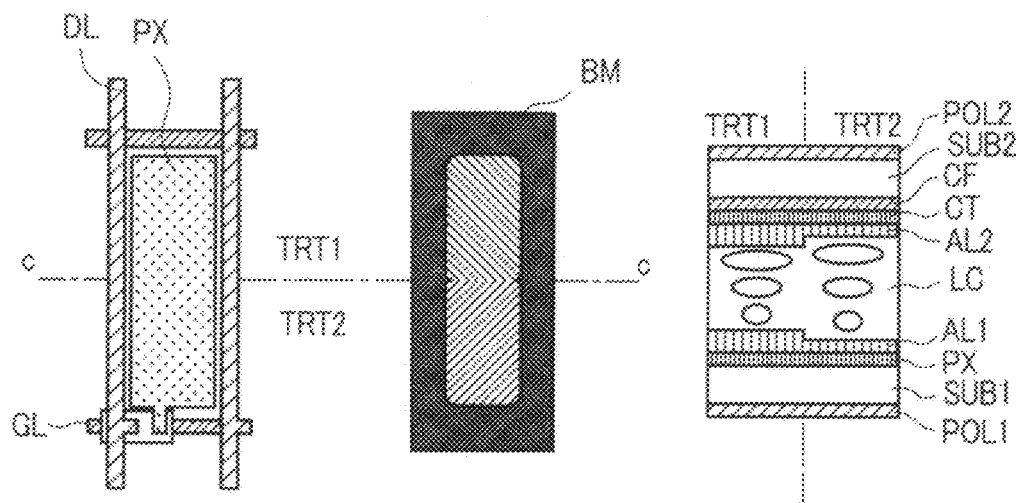

Further, FIG. 14A and FIG. 14B are drawings which extract one pixel from the above-mentioned respective pixels, for example, and FIG. 14C is a cross-sectional view taken along a line c-c in FIG. 14A and FIG. 14B.

In FIG. 14C, for the sake of brevity, only a pixel electrode PX and an orientation film AL1 are shown on a liquid-crystal-side surface of the transparent substrate SUB1, while only a color filter CF, a counter electrode CT and an orientation film AL2 are shown on a liquid-crystal-side surface of the transparent substrate SUB2. Here, on surfaces of the transparent substrate SUB1 and the transparent substrate SUB2 opposite to the liquid crystal, a polarizer POL1 and a polarizer POL2 are respectively formed so as to visualize the behavior of the liquid crystal.

As can be clearly understood from FIG. 14C, each one of the above-mentioned orientation film AL1 and the orientation film AL2 has a portion with a large film thickness and a portion with a small film thickness, wherein these boundaries are aligned in a plan view and, at the same time, are aligned with a boundary which divides the color tones of the above-mentioned color filters CF.

That is, in one divided region which is formed by dividing the color tone of the above-mentioned color filter CF, the thicknesses of the orientation films AL1, AL2 are set large and hence, a layer thickness of the liquid crystal is made small, while in another region, the thicknesses of the orientation films AL1, AL2 are set small and hence, the layer thickness of the liquid crystal is made large. Due to such a constitution, a drive voltage (a threshold value voltage) with respect to the liquid crystal is increased in one region and the drive voltage with respect to the liquid crystal is decreased in another region.

In the embodiment 1, two pixels which are allocated to the same color are formed and the respective pixels are controlled independently from each other. That is, the pixels are controlled to provide the difference in the driver outputs to the respective pixels. This embodiment aims at the acquisition of the substantially equal advantageous effect by uniformly changing the voltage applied to the liquid crystal without providing the difference in the driver outputs to the respective pixels. Accordingly, in this embodiment, the relationship of the respective color filters CF which differ in color tone in one pixel is substantially equal to the relationship explained in conjunction with the embodiment 1. The same goes for embodiments which are explained hereinafter.

Figure 15:
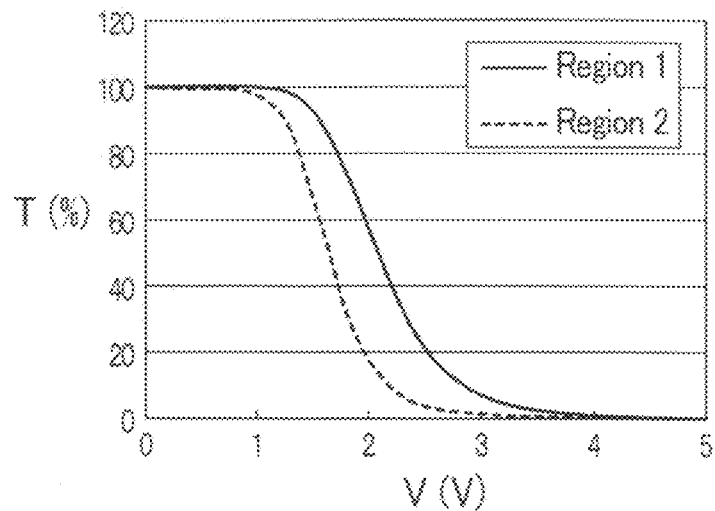
FIG. 15 is a graph showing the relationship between the voltage and the relative transmissivity obtained by the constitution shown in FIG. 14.

FIG. 15 is a graph showing a drive voltage to the liquid crystal in the first region (the region 1) TRT1 and a drive voltage to the liquid crystal in the second region (the region 2) TRT2 with respect to the same relative transmissivity of the pixel. The graph shows that the drive voltages to the liquid crystal are separately controlled in the inside of the same pixel.

Embodiment 3

Figures 16A, 16B, 16C:
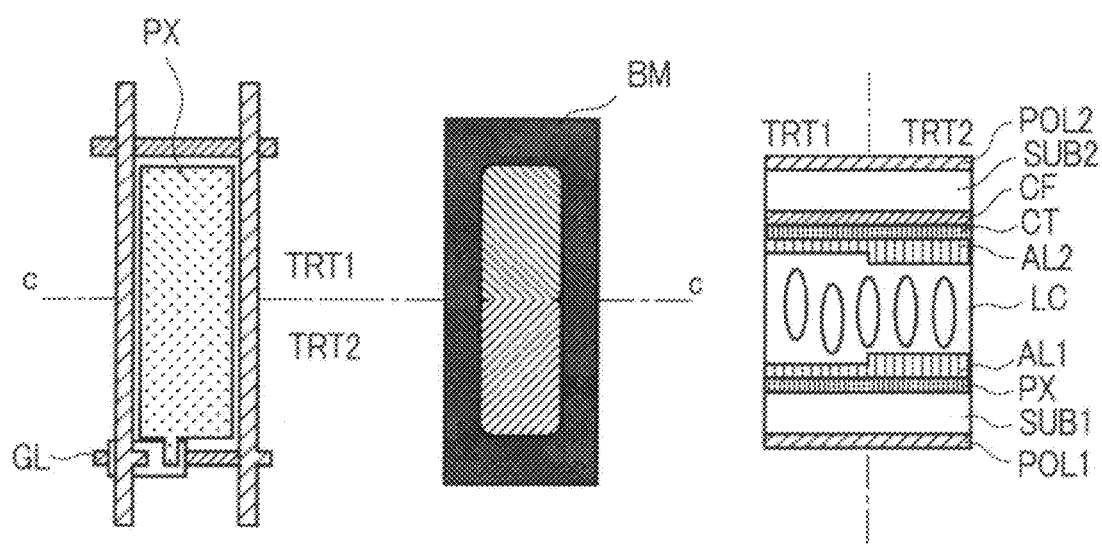

FIG. 16A to FIG. 16O are views showing another embodiment of the pixel of the liquid crystal display device according to the present invention and is a constitutional view when a so-called VA method is adopted. FIG. 16A to FIG. 16C are depicted corresponding to the views shown in FIG. 13A and FIG. 13B.

The constitution shown in FIG. 16A to FIG. 16C is substantially equal to the constitution shown in FIG. 13A and FIG. 13B. However, the constitution shown in FIG. 16A to FIG. 16C differs from the constitution shown in FIG. 13A and FIG. 13B with respect to a point that the difference in the drive voltage (the threshold value) with respect to the liquid crystals in respective regions divided corresponding to the difference in color tones of the color filters CF is reversed.

That is, the thickness of the orientation film AL1 on the transparent substrate SUB1 side and the thickness of the orientation film AL2 on the transparent substrate SUB2 side in the first region (the region 1) TRT1 are set smaller than the corresponding thicknesses in the second region (the region 2) TRT2 and hence, the layer thickness of the liquid crystal LC in the first region TRT1 is set larger than the layer thickness of the liquid crystal LC in the second region TRT2.

Figure 17:
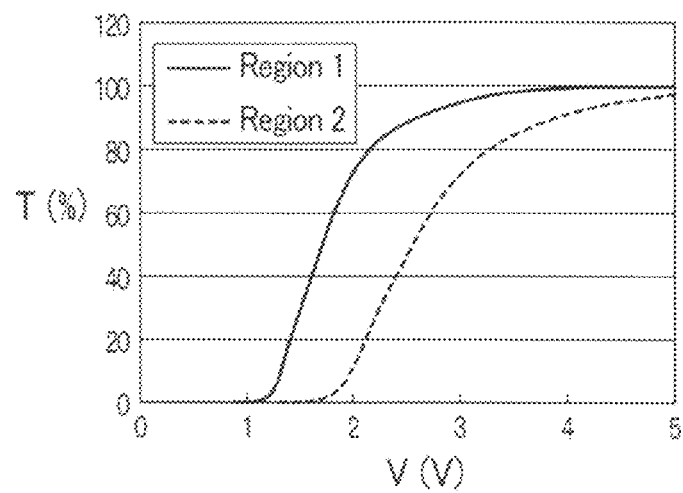
FIG. 17 is a graph showing the relationship between the voltage and the relative transmissivity obtained by the constitution shown in FIG. 16.

FIG. 17 is a graph showing a drive voltage to the liquid crystal in the first region (the region 1) and a drive voltage to the liquid crystal in the second region (the region 2) with respect to the same relative transmissivity of the pixel. The graph shows that the drive voltages to the liquid crystal are separately controlled in the inside of the same pixel.

Embodiment 4

Figures 18A, 18B, 18C:
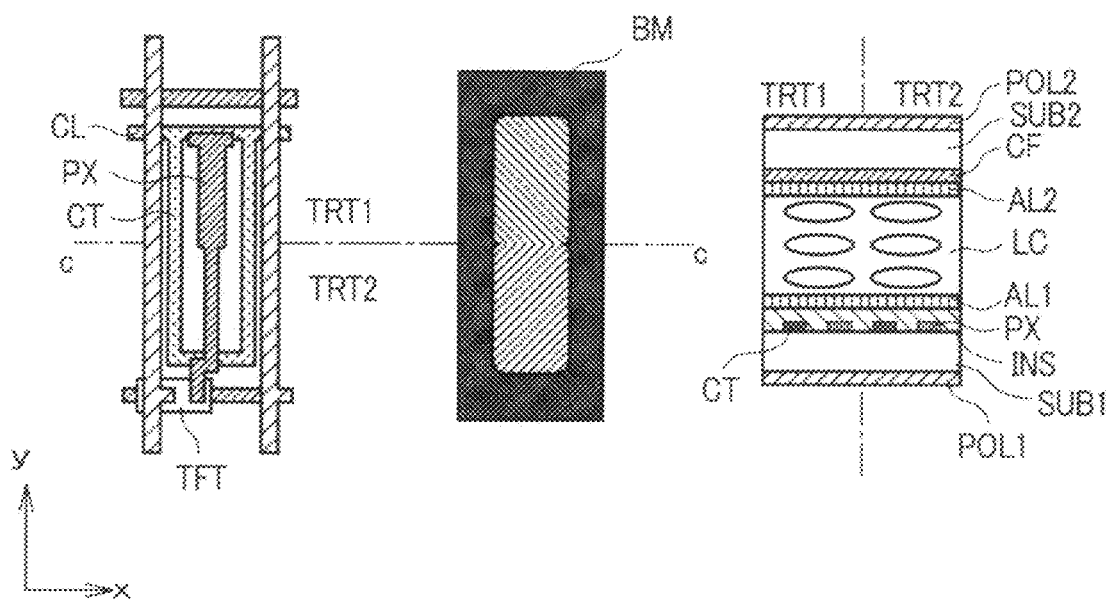

FIG. 18A to FIG. 18C are views showing another embodiment of the pixel of the liquid crystal display device according to the present invention and is a constitutional view when a so-called IPS method is adopted. A unit pixel for color display is constituted of three pixels which are arranged in parallel and FIG. 18A to FIG. 18C show one of these pixels.

FIG. 18A shows the pixel formed on the liquid-crystal-side surface of the transparent substrate SUB1, FIG. 18B shows the black matrix and the color filters formed on the liquid-crystal-side surface of the transparent substrate SUB2, and FIG. 18C is a cross-sectional view taken along a line c-c.

In the IPS method, as shown in FIG. 18A, the pixel electrode PX and the counter electrode CT which generates an electric field between the counter electrode CT and the pixel electrode PX are formed on the transparent substrate SUB1 side. These respective electrodes are formed of a strip-like electrode which extends in one direction in the inside of the pixel region and are alternately arranged in the direction which intersects the above-mentioned one direction in order of the counter electrode CT, the pixel electrode PX, the counter electrode CT. The liquid crystal is activated by generating an electric field having a component parallel to the transparent substrate SUB1 between the pixel electrode PX and the counter electrode CT and hence, the IPS method can obtain the wide viewing angle characteristics.

Further, using an imaginary segment which passes through the center of the pixel region and extends in the x direction in the drawing as a boundary, a line width of the pixel electrode PX in the first region (the region 1) TRT1 on the upper side in the drawing is set larger than a line width of the pixel electrode PX in the second region (the region 2) TRT2 on the lower. side in the drawing. Due to such a constitution, the distance between the pixel electrode PX and the counter electrode CT is narrowed in the first region TRT1 and hence, the drive voltage (the threshold value voltage) to the liquid crystal is lowered.

As has been described above, the color filter CF which is formed in the pixel differs in color tone between the first region TRT1 and the second region TFT2.

In this manner, by controlling the difference in the drive voltage applied to the liquid crystal in accordance with the width of the electrode, as shown in FIG. 18C, the layer thickness of the liquid crystal in the first region TRT1 and layer thickness of the liquid crystal in the second region TRT2 are set substantially equal.

Also in this embodiment, it is possible to obtain advantageous effects substantially equal to the advantageous effects of the embodiment 1.

Embodiment 5

Figures 19A, 19B, 19C:
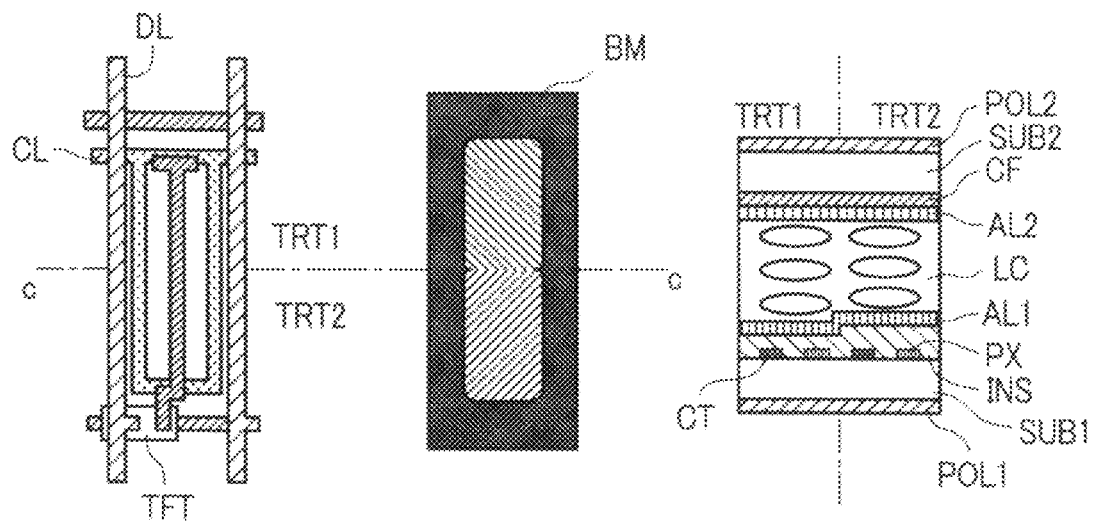

FIG. 19A to FIG. 19C are constitutional views showing another embodiment of the constitution of the pixel of the liquid crystal display device according to the present invention and correspond to FIG. 18A to FIG. 18C.

In comparison with the case shown in FIG. 18A to FIG. 18C, the pixel electrodes PX and the counter electrodes CT which are formed in a strip shape are alternately arranged in the inside of the pixel region. However, this embodiment differs from the embodiment shown in FIG. 18 with respect to a point that an interval width between the pixel electrode PX and the counter electrode CT is set equal in the first divided region TRT1 and the second divided region TRT2. In other words, in both of the first divided region TRT1 and the second divided region TRT2, the line widths of the pixel electrode PX and the counter electrode CT are set uniformly.

On the other hand, as shown in FIG. 19C, for example, with respect to an insulation film INS which is positioned below the orientation film AL1 formed on the transparent SUB1 side, a thickness of the insulation film INS in the first divided region TRT1 is set smaller than a thickness of the insulation film INS in the second divided region TRT2 and hence, the layer thickness of the liquid crystal layer in the first divided region TRT1 is set larger than the layer thickness of the liquid crystal layer in the second divided region TRT2.

Figure 20:
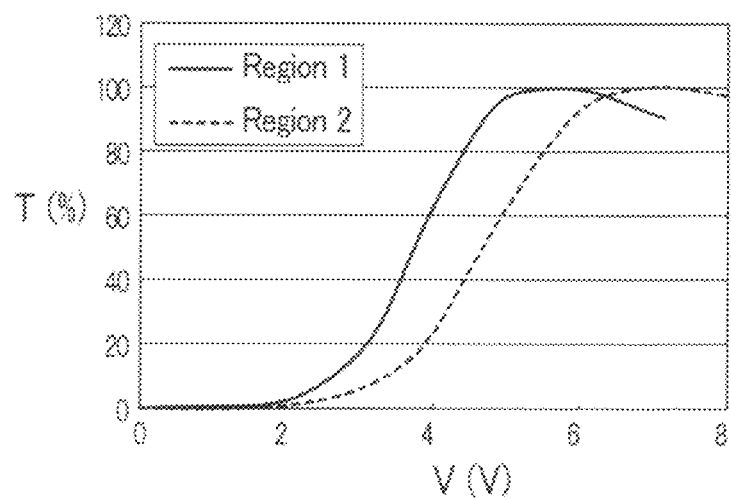
FIG. 20 is a graph showing the relationship between the voltage and the relative transmissivity obtained by the constitution shown in FIG. 19.

In this case, as shown in FIG. 20, the difference arises between the drive voltage in the first divided region (the region 1) TFT1 and the drive voltage in the second divided region (the region 2) TFT2 and hence, it is possible to obtain advantageous effects similar to the advantageous effects explained in conjunction with the embodiment 1.

Here, it is confirmed that the characteristics of voltage (V)-relative transmissivity (%) shown in FIG. 20 are obtained by the constitution shown in FIG. 18 in the substantially same manner.

Embodiment 6

Figures 21A, 21B, 21C:
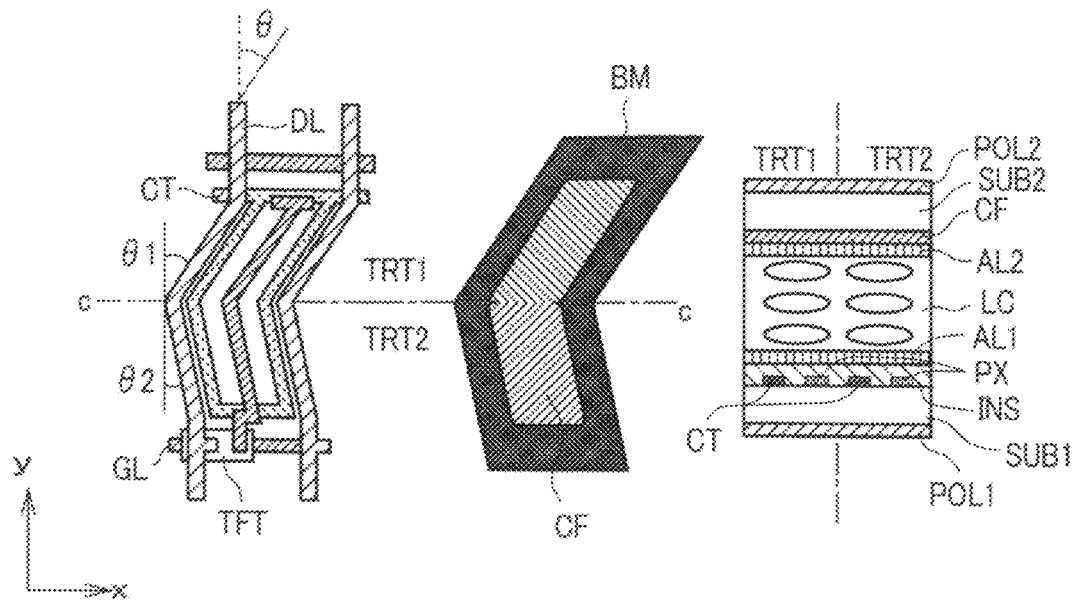

FIG. 21A to FIG. 21C are constitutional views showing another embodiment of the constitution of the pixel of the liquid crystal display device according to the present invention and correspond to FIG. 18A to FIG. 18C.

The constitution which makes this embodiment different from the embodiment shown in FIG. 18 lies in that using an imaginary segment which passes the substantially center of the pixel region and extends in the x direction in the drawing as a boundary, the pixel electrode PX and the counter electrode CT of the first divided region TRT1 in the upper side in the drawing are arranged in an upward-sloping manner, the pixel electrode PX and the counter electrode CT of the second divided region TRT2 in the lower side in the drawing are arranged in a downward-sloping manner, and the respective corresponding electrodes are connected with each other at a portion of the imaginary segment. In other words, the pixel electrode PX and the counter electrode CT in the inside of the pixel region are formed in an "L shape" which has a bent portion at the portion of imaginary segment.

Along with such a constitution, bent portions are also formed on the drain signal lines DL in conformity with shapes of the pixel electrode PX and the counter electrode CT. This provision is made to obviate the reduction of the so-called numerical aperture of the pixels.

Here, assuming the inclination of the pixel electrode PX and the counter electrode CT in the first divided region TRT1 as θ1 (with respect to the y direction in the drawing) and the inclination of the pixel electrode PX and the counter electrode CT in the second divided region TRT2 as θ2 (with respect to the y direction in the drawing), the pixel electrode PX and the counter electrode CT are formed to satisfy the relationship θ1>θ2.

Here, in this case, the initial orientation angle θ of the liquid crystal is set such that θ=0° when the liquid crystal is p-type and θ=90° when the liquid crystal is n-type.

Further, since the drain signal line DL includes the bent portion, the pixel region is also formed to have a bent portion. Although the black matrix BM and the color filters CF also have bent portions as shown in FIG. 21B, as can be clearly understood from FIG. 21C, a layer thickness of the liquid crystal layer is set uniform in the first divided region TRT1 and the second divided region TRT2.

Figure 22:
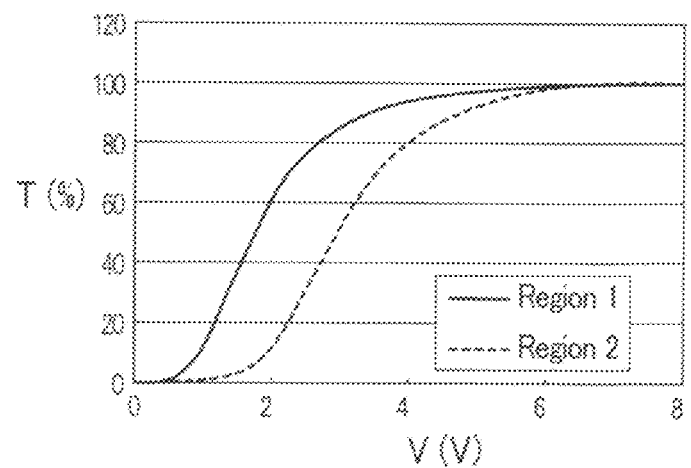
FIG. 22 is a graph showing the relationship between the voltage and the relative transmissivity obtained by the constitution shown in FIG. 21.

Also with the above-mentioned constitution, as shown in FIG. 22, it is possible to provide the difference between the drive voltage of the first divided region (the region 1) TRT1 and the second divided region (the region 2) TRT2 and hence, it is possible to obtain advantageous effects similar to advantageous effects obtained by the embodiment 1.

Embodiment 7

Figures 23A, 23B, 23C:
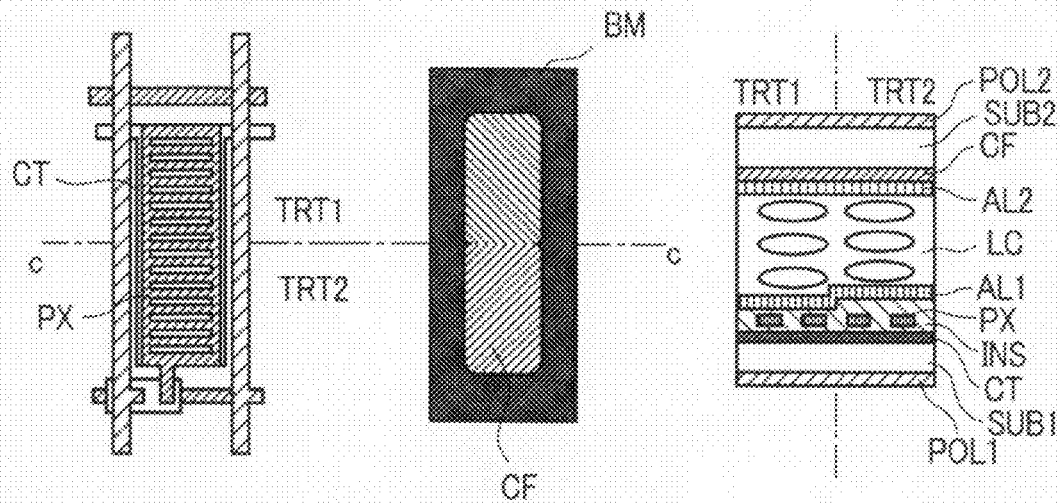

FIG. 23A to FIG. 23C are constitutional views showing another embodiment of the constitution of the pixel of the liquid crystal display device according to the present invention and correspond to FIG. 19A to FIG. 19C.

The constitution which makes this embodiment different from the embodiment shown in FIG. 19A to FIG. 19C lies in that the counter electrode CT is formed over the whole region of the pixel region except for a small periphery of the pixel region and the pixel electrode PX is on the counter electrode CT in an overlapped manner by way of an insulation film INS. Here, the pixel electrode PX is constituted of a plurality of electrodes which extend in the x direction and are arranged in parallel in the y direction in the drawing, for example, and both ends of these electrodes are formed in a pattern that these ends are electrically connected with each other for supplying electricity.

Also in such a constitution, a component of an electric field parallel to the transparent substrate SUB1 is generated between the counter electrode CT and the pixel electrode PX thus enabling the driving of the liquid crystal with the electric field component.

Further, over the whole area of the pixel region, that is, over the first divided region TRT1 and the second divided region TRT2, a distance between each electrode of the pixel electrode PX and another neighboring electrode is set uniform.

On the other hand, as can be clearly understood from FIG. 23C, with respect to, for example, the insulation film INS which is positioned below the orientation film AL1 formed on the transparent substrate SUB1 side, a film thickness of the insulation film INS in the first divided region TRT1 is set smaller than the film thickness of the insulation film INS in the second divided region TRT2. Accordingly, a layer thickness of the liquid crystal layer in the first divided region TRT1 is set larger than the layer thickness of the liquid crystal layer in the second divided region TRT2.

Also with the above-mentioned constitution, it is possible to obtain advantageous effects similar to the advantageous effects obtained by the embodiment 1.

Embodiment 8

Figures 24A, 24B, 24C:
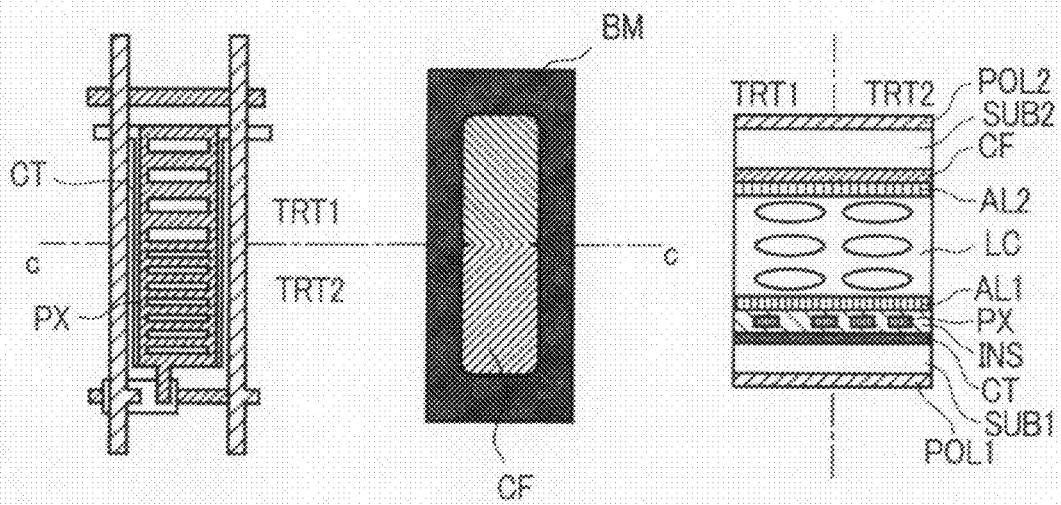

FIG. 24A to FIG. 24C are constitutional views showing another embodiment of the constitution of the pixel of the liquid crystal display device according to the present invention and correspond to FIG. 23A to FIG. 23C.

The constitution which makes this embodiment different from the embodiment shown in FIG. 23A to FIG. 23C lies in a spaced-apart distance between respective electrodes which constitute the pixel electrode PX. That is, the spaced-apart distance between respective electrodes is set large in the first divided region TRT1 and is set small in the second divided region TRT2.

On the other hand, as can be clearly understood from FIG. 24C, with respect to, for example, the insulation film INS which is positioned below the orientation film AL1 formed on the transparent substrate SUB1 side, a film thickness of the insulation film INS in the first divided region TRT1 and the thickness of the insulation film INS in the second divided region TRT2 are set equal. Accordingly, a layer thickness of the liquid crystal layer in the first divided region TRT1 and the layer thickness of the liquid crystal layer in the second divided region TRT2 are set substantially equal.

Also with the above-mentioned constitution, it is possible to obtain advantageous effects similar to the advantageous effects obtained by the embodiment 1.

Embodiment 9

Figures 25A, 25B, 25C:
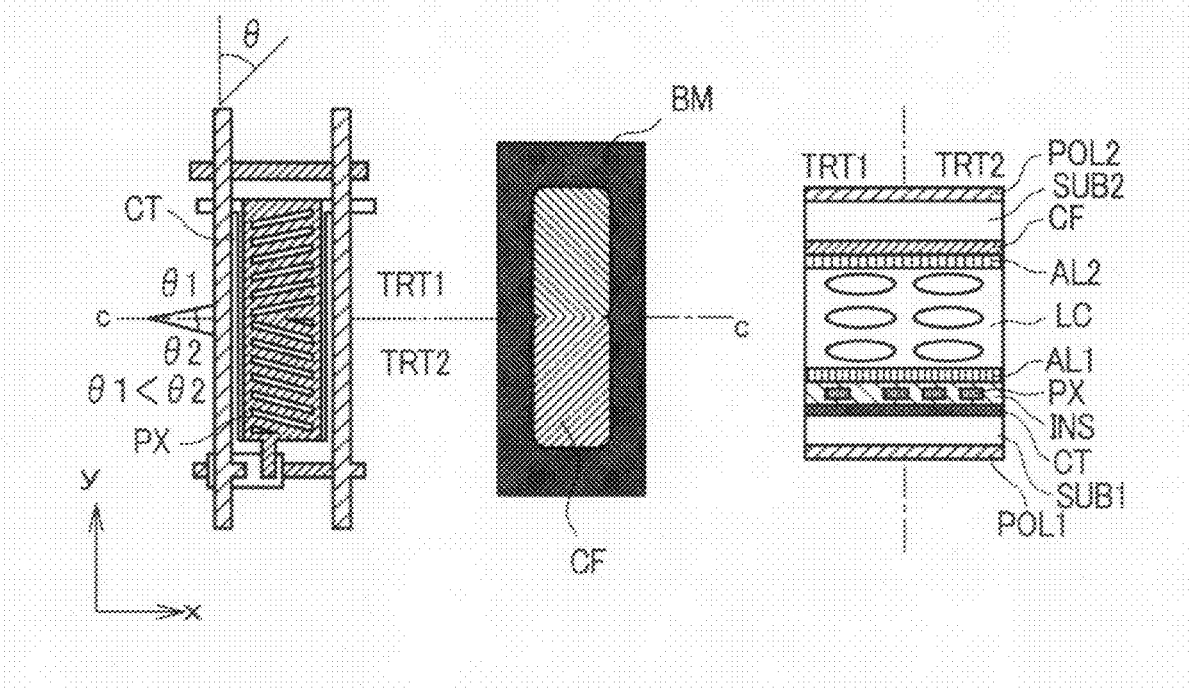

FIG. 25A to FIG. 25C are views showing another embodiment of the pixel of the liquid crystal display device according to the present invention and corresponds to FIG. 24A to FIG. 24C.

First of all, the constitution which makes this embodiment different from the embodiment shown in FIG. 24A to FIG. 24C lies in a pattern of the pixel electrode PX which is constituted of a group consisting of electrodes. That is, while the respective electrodes in the first divided region TRT1 are formed in an inclined manner with an angle of +θ1 with respect to the x direction in the drawing, the respective electrodes in the second divided region TRT2 are formed in an inclined manner with an angle of −θ2 with respect to the x direction in the drawing, and the relationship θ1<θ2 is established between these angles.

In this case, the initial orientation angle θ of the liquid crystal is set such that θ=90° when the liquid crystal is p-type and θ=0° when the liquid crystal is n-type.

In this manner, by setting the angle of the electrodes in the first divided region TRT1 smaller than the angle of the electrodes in the second divided region TRT2, it is possible to set the drive voltage of the liquid crystal in the first divided region TRT1 lower than the drive voltage of the liquid crystal in the second divided region TRT2. This implies that, with the provision of the divided regions, it is possible to obtain the substantially equal advantageous effects which are obtained by changing the output of the driver.

From the above, as shown in FIG. 25C, the layer thickness of the liquid crystal LC is set uniform over the first divided region TRT1 and the second divided region TRT2.

The above-mentioned respective embodiments can be used independently or in combination. It is because the advantageous effects of the respective embodiments can be obtained independently and synergistically.

What is claimed is:

1. A liquid crystal display device comprising:
a pixel which is allocated to one color; and
color filters which differ in color tone and are allocated to the same color and are formed on a first divided region and a second divided region of the pixel, wherein
a layer thickness of liquid crystal in the first divided region is set larger than a layer thickness of liquid crystal in the second divided region, and
wherein the first color filter formed in the first divided region and the second color filter formed in the second divided region are formed such that when chromaticity coordinates of color which are observed through a color filter of the same color are changed corresponding to a change from a high gray scale to a low gray scale, a color filter which is specified with coordinates at a starting-point side of movement of the change is formed as the first color filter and a color filter which is specified with coordinates at a terminal-point side of the movement of the change is formed as the second color filter.

2. A liquid crystal display device according to claim 1, wherein the second divided region is configured as a pixel which compensates the coordinates displacement in CIE chromaticity coordinates of display information from the first divided region.

3. A liquid crystal display device according to claim 1, wherein the liquid crystal display device is driven in a state that the luminance of the first divided region is set larger than the luminance of the second divided region.

4. A liquid crystal display device according to claim 1, wherein the respective pixels which constitute a unit pixel for color display and are allocated to respective colors consisting of red, green and blue are formed in a state that the respective pixels are arranged close to each other, and the first divided region and the second divided region are provided to each pixel.

5. A liquid crystal display device according to claim 1, wherein the respective color filters which differ in color tone differ in coordinates on CIE chromaticity coordinates.

* * * * *